(12) United States Patent
Kim et al.

(10) Patent No.: US 9,078,245 B2
(45) Date of Patent: Jul. 7, 2015

(54) METHOD AND APPARATUS FOR TRANSMITTING CONTROL INFORMATION IN WIRELESS LOCAL AREA NETWORK USING MULTI-CHANNEL

(75) Inventors: Eun Sun Kim, Anyang-si (KR); Yong Ho Seok, Anyang-si (KR)

(73) Assignee: LG Electronics Inc., Seoul (KR)

( * ) Notice: Subject to any disclaimer, the term of this patent is extended or adjusted under 35 U.S.C. 154(b) by 194 days.

(21) Appl. No.: 13/818,935

(22) PCT Filed: Aug. 26, 2011

(86) PCT No.: PCT/KR2011/006313
§ 371 (c)(1),
(2), (4) Date: Feb. 25, 2013

(87) PCT Pub. No.: WO2012/026779
PCT Pub. Date: Mar. 1, 2012

(65) Prior Publication Data
US 2013/0148625 A1    Jun. 13, 2013

Related U.S. Application Data

(60) Provisional application No. 61/377,449, filed on Aug. 26, 2010.

(51) Int. Cl.
| | |
|---|---|
| *H04W 4/00* | (2009.01) |
| *H04J 11/00* | (2006.01) |
| *H04J 1/00* | (2006.01) |
| *H04L 1/02* | (2006.01) |
| *H04W 72/04* | (2009.01) |
| *H04L 1/00* | (2006.01) |
| *H04L 1/06* | (2006.01) |
| *H04L 5/00* | (2006.01) |
| *H04L 27/26* | (2006.01) |
| *H04W 28/18* | (2009.01) |
| *H04W 84/12* | (2009.01) |

(52) U.S. Cl.
CPC ............. *H04W 72/04* (2013.01); *H04L 1/0025* (2013.01); *H04L 1/06* (2013.01); *H04L 5/001* (2013.01); *H04L 5/0025* (2013.01); *H04L 5/0051* (2013.01); *H04L 27/2613* (2013.01); *H04W 28/18* (2013.01); *H04W 84/12* (2013.01)

(58) Field of Classification Search
USPC ........... 370/329, 343, 210, 328, 208; 375/267
See application file for complete search history.

(56) References Cited

U.S. PATENT DOCUMENTS 7,952,990 B1 *    5/2011    Lou et al. ...................... 370/208
2007/0064666 A1 *    3/2007    Kwun et al. .................. 370/343
(Continued)

*Primary Examiner* — Kiet G Tang
(74) *Attorney, Agent, or Firm* — Birch, Stewart, Kolasch & Birch, LLP

(57) ABSTRACT

A method of transmitting control information in a WLAN system using a multi-channel obtained by aggregating a first sub-channel and a second sub-channel is provided. The method includes transmitting, by a transmitting station, a first physical (PHY) preamble over the first sub-channel, transmitting, by the transmitting station, a second PHY preamble over the second sub-channel, and transmitting, by the transmitting station, data symbols using N spatial streams transmitted over the first sub-channel and M spatial streams transmitted over the second sub-channel, wherein the first PHY preamble comprises control information necessary to demodulate and decode the data symbols transmitted over the N spatial streams, and the second PHY preamble comprises control information necessary to demodulate and decode the data symbols transmitted over the M spatial streams, and the first PHY preamble and the second PHY preamble are simultaneously transmitted, and the N and the M are different natural numbers.

9 Claims, 5 Drawing Sheets

(56) References Cited

U.S. PATENT DOCUMENTS

| | | |
|---|---|---|
| 2007/0121547 A1 | 5/2007 | Huh et al. |
| 2007/0189214 A1 | 8/2007 | Hyon et al. |
| 2008/0075187 A1* | 3/2008 | Sutskover .................... 375/267 |
| 2008/0137527 A1* | 6/2008 | Bick et al. .................... 370/210 |
| 2008/0205364 A1 | 8/2008 | Park et al. |
| 2010/0150058 A1* | 6/2010 | Jungnickel .................... 370/328 |

* cited by examiner

METHOD AND APPARATUS FOR TRANSMITTING CONTROL INFORMATION IN WIRELESS LOCAL AREA NETWORK USING MULTI-CHANNEL

CROSS REFERENCE TO RELATED APPLICATIONS

This application is the National Phase of PCT/KR2011/006313 filed on Aug. 26, 2011, which claims priority under 35 U.S.C. 119(e) to U.S. Provisional Application No. 61/377,449 filed on Aug. 26, 2010, all of which are hereby expressly incorporated by reference into the present application.

TECHNICAL FIELD

The present invention is relates to wireless communication, and more particularly, to a method and apparatus for transmitting control information in wireless local area network using a multi-channel.

BACKGROUND ART

With the recent development of information communication technology, a variety of wireless communication techniques are being developed. From among the techniques, a WLAN is technique which enables wireless access to the Internet at homes or companies or in specific service providing areas using mobile terminals, such as a Personal Digital Assistant (PDA), a laptop computer, and a Portable Multimedia Player (PMP), based on radio frequency technology.

Lots of standardization tasks are being carried out since Institute of Electrical and Electronics Engineers (IEEE) 802 (that is, the standard organization for WLAN technique) was set up on February, 1980.

The initial WLAN technique was able to support the bit rate of 1 to 2 Mbps through frequency hopping, band spreading, and infrared communication by using a 2.4 GHz frequency band in accordance with the IEEE 802.11 standard, but the recent WLAN technique can support a maximum bit rate of 54 Mbps using Orthogonal Frequency Division Multiplex (OFDM) method. Furthermore, in the IEEE 802.11 standard, the standards of various techniques, such as the improvements of Quality of Service (QoS), the compatibility of Access Point (AP) protocols, security enhancement, radio resource measurement, wireless access vehicular environment for vehicle environments, fast roaming, a mesh network, interworking with an external network, and wireless network management, are put to practical use or being developed.

With the spread of WLAN being activated and applications using WLAN being diversified, there is a need for a new WLAN system for supporting the throughput higher than the data processing speed supported by the IEEE 802.11n standard. A Very High Throughput (VHT) WLAN system is one of IEEE 802.11 WLAN systems recently proposed in order to support the data processing speed of 1 Gpbs or higher. The term 'VHT WLAN system' is arbitrary, and a feasibility test for 8×8 MIMO and a system using a channel bandwidth of 80 MHz or higher is in progress in order to provide the throughput of 1 Gpbs or higher.

To secure a channel having a wide frequency bandwidth in the frequency band used by the WLAN system may be practically difficult. For example, in an ISM (Industrial Scientific and Medical) band used by the WLAN system, various devices, heterogeneous communication systems, and legacy systems, such as IEEE 802.11a/b/g/n, which use the ISM (Industrial Scientific and Medical) band, coexist. In order to obtain a channel having a wide frequency bandwidth in this environment, a scheme for aggregating and utilizing a plurality of non-contiguous channels is being researched.

When it is used a multi-channel obtained by aggregating a plurality of non-contiguous channels by the WLAN system, a link adaptation method for each of sub-channels forming the multi-channel, a problem, such as a reduction in transmission efficiency that may occur when transmitting data on a plurality of spatial streams through the multi-channel, and a protocol for solving the transmission synchronization problem of data packets need to be taken into consideration.

SUMMARY OF INVENTION

Technical Problem

The present invention provides a method of transmitting control information which can improve radio resource usage efficiency in a WLAN system using a multi-channel and an apparatus for supporting the method.

Solution to Problem

In an aspect of the present invention, a method of transmitting control information in a WLAN system using a multi-channel obtained by aggregating a first sub-channel and a second sub-channel includes transmitting, by a transmitting station, a first physical (PHY) preamble over the first sub-channel, transmitting, by the transmitting station, a second PHY preamble over the second sub-channel, and transmitting, by the transmitting station, data symbols using N spatial streams transmitted over the first sub-channel and M spatial streams transmitted over the second sub-channel, wherein the first PHY preamble comprises control information necessary to demodulate and decode the data symbols transmitted over the N spatial streams, and the second PHY preamble comprises control information necessary to demodulate and decode the data symbols transmitted over the M spatial streams, and the first PHY preamble and the second PHY preamble are simultaneously transmitted, and the N and the M are different natural numbers.

The first sub-channel and the second sub-channel may be non-contiguous frequency bands.

The first sub-channel and the second sub-channel may have an identical bandwidth.

The first PHY preamble and the second PHY preamble may have an identical number of training sequences.

The first PHY preamble may include information about the number of training sequences transmitted over the first sub-channel and the number of spatial streams transmitted over the first sub-channel, and the second PHY preamble may include information about the number of training sequences transmitted over the second sub-channel and the number of spatial streams transmitted over the second sub-channel.

Each of the first PHY preamble and the second PHY preamble may include four training sequences, The first PHY preamble may include information about the number of spatial streams transmitted over the first sub-channel, and the second PHY preamble may include information about the number of spatial streams transmitted over the second sub-channel.

A first MCS (Modulation and Coding Scheme) value, applied to an OFDM (Orthogonal Frequency Division Multiplexing) symbol of data transmitted over the first sub-channel and a second MCS applied to an OFDM symbol of data transmitted over the second sub-channel may be differently set.

The first PHY preamble may include an index indicating the first MCS, and the second PHY preamble may include an index indicating the second MCS.

The first PHY preamble may include an MCS feedback request message, requesting a reception STA which receives at least one spatial stream transmitted over the first sub-channel to send an adequate candidate MCS index in order to update the first MCS, and the second PHY preamble may include an MCS feedback request message, requesting a reception STA which receives at least one spatial stream transmitted over the second sub-channel to send an adequate candidate MCS in order to update the second MCS.

In another aspect of the present invention, a wireless apparatus operating in a WLAN system using a multi-channel obtained by aggregating a first sub-channel and a second sub-channel includes a processor, and the processor is configured to send a first PHY preamble over the first sub-channel, send a second PHY preamble over the second sub-channel, and send data packets using N spatial streams transmitted over the first sub-channel and M spatial streams transmitted over the second sub-channel, wherein the first PHY preamble comprises control information necessary to demodulate and decode the data symbols transmitted over the N spatial streams, and the second PHY preamble comprises control information necessary to demodulate and decode the data symbols transmitted over the M spatial streams, and the first PHY preamble and the second PHY preamble are simultaneously transmitted, and the N and the M are different natural numbers.

Advantageous Effects of Invention

In a WLAN system using a multi-channel, transmission efficiency can be improved by setting a different MCS (Modulation and Coding Scheme) value by sub-channel. Furthermore, the number of spatial streams for each sub-channel can be controlled according to a channel condition for each sub-channel.

MODE FOR THE INVENTION

Hereinafter, embodiments of the present invention are described in detail with reference to the accompanying drawings.

A WLAN system in which an embodiment of the present invention may be implemented includes at least one Basic Service Set (BSS). The BSS is a set of stations (STAs) which are successfully synchronized with each other for communication. The BSS may be classified into an independent BSS (IBSS) and an infrastructure BSS.

The infrastructure BSS includes at least one non-AP STA and Access Point (AP). The AP is a function entity for providing STAs, coupled thereto, with access to distribution service through a wireless medium. The AP may also be called another terminology, such as a centralized controller, a Base Station (BS), and a scheduler.

An STA is a specific function entity, including an MAC (medium access control) and PHY (wireless-medium physical layer) interface that satisfies the IEEE 802.11 standard. The STA may be an AP STA or a non-AP STA, but refers to a non-AP STA different to an AP, unless otherwise described hereinafter. The STA may also be called another terminology, such as User Equipment (UE), a Mobile Station (MS), a Mobile Terminal (MT), a portable device, or an interface card.

In describing the present invention hereinafter, an AP and an STA are entities for transmitting and receiving radio frames and may be called a transmitter or a receiver. In a procedure for initiating specific service between an AP and an STA or between STAs, the AP or the STA may be called an initiator that initiates or requests the procedure or a responder that responds to a request. If a radio frame is transmitted by beamforming, an AP or an STA may be called a beamformer that performs beamforming transmission or a beamformee that receives the radio frame.

For convenience of description hereinafter, unlike a WLAN system supporting a method of transmitting control information according to an embodiment of the present invention, a conventional WLAN system is called an HT system and a legacy system. An HT system refers to a WLAN system supporting the IEEE 802.11n standard, and an HT-STA refers to an STA supporting the IEEE 802.11n standard. A legacy system refers to a lower version (for example, a WLAN system supporting the IEEE 802.11a/b/g standards) of the IEEE 802.11n standard, and a legacy STA refers to an STA supporting a lower version (for example, the IEEE 802.11a/b/g standards) of the IEEE 802.11n standard.

Figure 1:
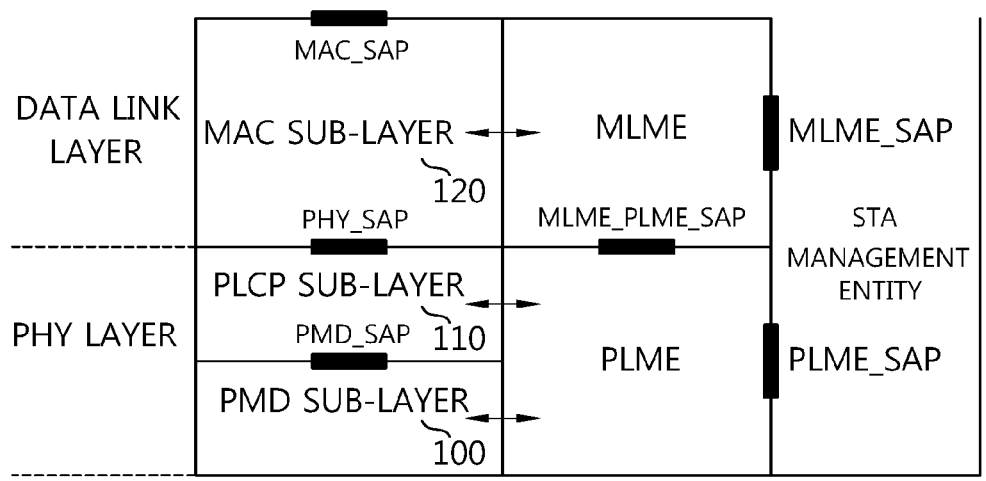
FIG. 1 is a diagram showing the physical layer architecture of IEEE 802.11.

FIG. 1 is a diagram showing the physical layer (PHY) architecture of the IEEE 802.11 standard.

The PHY layer architecture of the IEEE 802.11 standard includes a PHY Layer Management Entity (PLME), a Physical Layer Convergence Procedure (PLCP) sub-layer 110, and a Physical Medium Dependent (PMD) sub-layer 100. The PLME provides a function of managing the PHY layer while operating in conjunction with a MAC Layer Management Entity (MLME). The PLCP sub-layer 110 transfers a MAC Protocol Data Unit (MPDU), received from a MAC sub-layer 120, to the PMD sub-layer 100 or transfers a frame, received from the PMD sub-layer 100, to the MAC sub-layer 120 according to the instruction from a MAC sub-layer between the MAC sub-layer 120 and the PMD sub-layer 100. The PMD sub-layer 100 is a lower layer of the PLCP, and it enables the transmission and reception of PHY layer entities between two STAs through a wireless medium.

The PLCP sub-layer 110 adds supplementary fields, including information necessary for a PHY layer transceiver, in a process of receiving an MPDU from the MAC sub-layer 120 and transferring the MPDU to the PMD sub-layer 100. The added fields may include a PLCP preamble, a PLCP header, and tail bits over a data field in the MPDU. The PLCP preamble functions to have a receiver prepared for synchronization and antenna diversity, before a PLCP Service Data Unit (PSDU) (=MPDU) is transmitted. The PLCP header includes a field including information about a frame. The PLCP header will be described in more detail later with reference to FIG. 2.

In the PLCP sub-layer 110, a PLCP Protocol Data Unit (PPDU) is created by attaching the above-described fields to the MPDU and then transmitted to a reception STA via the PMD sub-layer 100. The reception STA receives the PPDU, obtains information necessary to restore data from the PLCP preamble and the PLCP header, and restores data based on the information.

Figure 2:
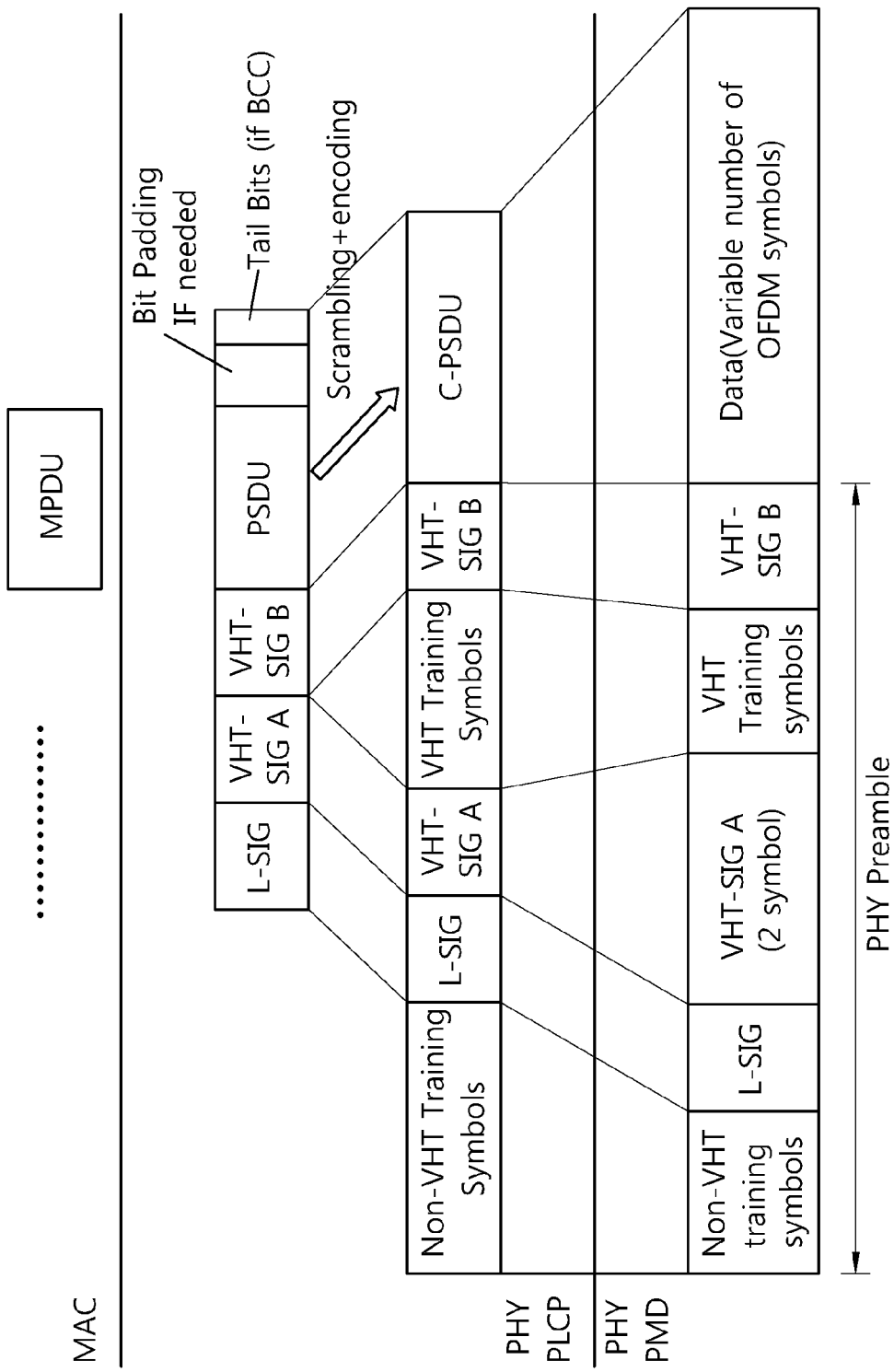
FIG. 2 shows an example of a procedure of transmitting a PLCP frame.

FIG. 2 shows an example of a procedure of transmitting the PLCP frame.

The MPDU of the MAC sub-layer is transferred to the PLCP sub-layer of the PHY layer for transmission through a wireless medium. In the PLCP sub-layer, an L-SIG field, including control information about a legacy STA, and a VHT-SIG A field and a VHT-SIG B field including control information about a VHT STA are attached, and padding bits may be attached as occasion demands. Tail bits may be further attached according to an encoding scheme. Here, non-VHT training symbols and VHT training symbols are attached. The non-VHT training symbols are used for a reception STA to obtain frame timing acquisition, Automatic Gain Control (AGC), and coarse frequency acquisition and may be used for channel estimation for demodulating the L-SIG field and the VHT-SIG B field. The VHT training symbols may be used for channel estimation for demodulating the VHT-SIG B field and the data field. The non-VHT training symbols may be contained in an L-STF (short training field) and an L-LTF (long training field) and transmitted. The VHT training symbols may be contained in the VHT-STF and the VHT-LTF and transmitted. Here, the number of VHT-LTFs may be determined according to the number of spatial streams when the data field is subjected to spatial multiplexing (SM) and transmitted (in other words, when the data field is transmitted through a plurality of spatial streams.

Table 1 shows an example of the number of VHT-LTFs that are transmitted according to the number of spatial streams.

TABLE 1

| Number of Spatial Streams | Number of VHT-LTFs |
| --- | --- |
| 1 | 1 |
| 2 | 2 |
| 3 | 4 |
| 4 | 4 |
| 5 | 6 |
| 6 | 6 |
| 7 | 8 |
| 8 | 8 |

The MPDU of the MAC sub-layer is transmitted from the PMD sub-layer to a counterpart STA through a wireless medium via the PLCP sub-layer. The PPDU transmitted from the PMD layer through the wireless medium includes a non-VHT preamble, an L-SIG field, a VHT-SIG A field, a VHT training field, a VHT-SIG B field, and a data field. Hereinafter, fields added to the PSDU that is transmitted from the PLCP layer of a transmission STA (including an AP) to the MAC layer are generally called a PHY preamble.

Meanwhile, it is assumed that the present invention is based on a WLAN network environment using a multi-channel obtained by aggregating non-contiguous channel sets. It is preferred that a wider channel bandwidth be secured in order to obtain a higher throughput. It is, however, difficult to secure a contiguous and wide frequency band in the frequency band used by a WLAN system. In order to solve this problem, a multi-channel obtained by aggregating a plurality of non-contiguous channels may be used. Hereinafter, each of the non-contiguous channels forming the multi-channel is called a sub-channel, and a multi-channel obtained by aggregating a first sub-channel and a second sub-channel is described as an example. Here, the first sub-channel and the second sub-channel are channels that are not contiguous to each other. The first sub-channel and the second sub-channel may also be called a first frequency segment and a second frequency segment, respectively.

In the following examples, the number of sub-channels is assumed to be 2, for convenience of description. The multi-channel may be obtained by aggregating three or more non-contiguous frequency bands. Furthermore, the bandwidth of each sub-channel may be set variously, for example, 5 MHz, 10 MHz, 20 MHz, 40 MHz, or 80 MHz.

For example, if two sub-channels each having a bandwidth of 80 MHz are aggregated and used, a WLAN system may use a channel bandwidth of 160 MHz. If spectrum efficiency is not high, however, a gain may not be high, as compared with the case in which only one contiguous channel is used.

In order to improve spectrum efficiency, link adaptation that is one of various factors related to spectrum efficiency may be taken into consideration. In a WLAN system, a link adaptation procedure contributes to improving spectrum efficiency by adaptively determining an MCS (Modulation and Coding Scheme) value, used to send data, according to a change of a channel condition.

As a method of setting MCS values for sub-channels in a multi-channel environment, the same MCS value may be set for all sub-channels. As another method, different MCS values may be set for the sub-channels.

To set the same MCS value for all the sub-channels may reduce complexity in implementation. However, in a multi-channel obtained by aggregating a first sub-channel and a second sub-channel not contiguous to each other, to set the same MCS value for the first sub-channel and the second sub-channel may reduce spectrum efficiency. A possibility that channel environments of the first and the second sub-channels that are not contiguous to each other may differ from each other may be higher than a possibility that channel environments of sub-channels that are contiguous to each other may differ from each other. Accordingly, it may be more efficient to set an MCS value suitable for a channel environment of each sub-channel. The number of spatial streams transmitted over each sub-channel may also be taken into account when the MCS value is set.

The present invention includes a method of transmitting data by setting an MCS value or the number of spatial streams or both by each sub-channel and a method of transmitting control information for the method.

Figure 3:
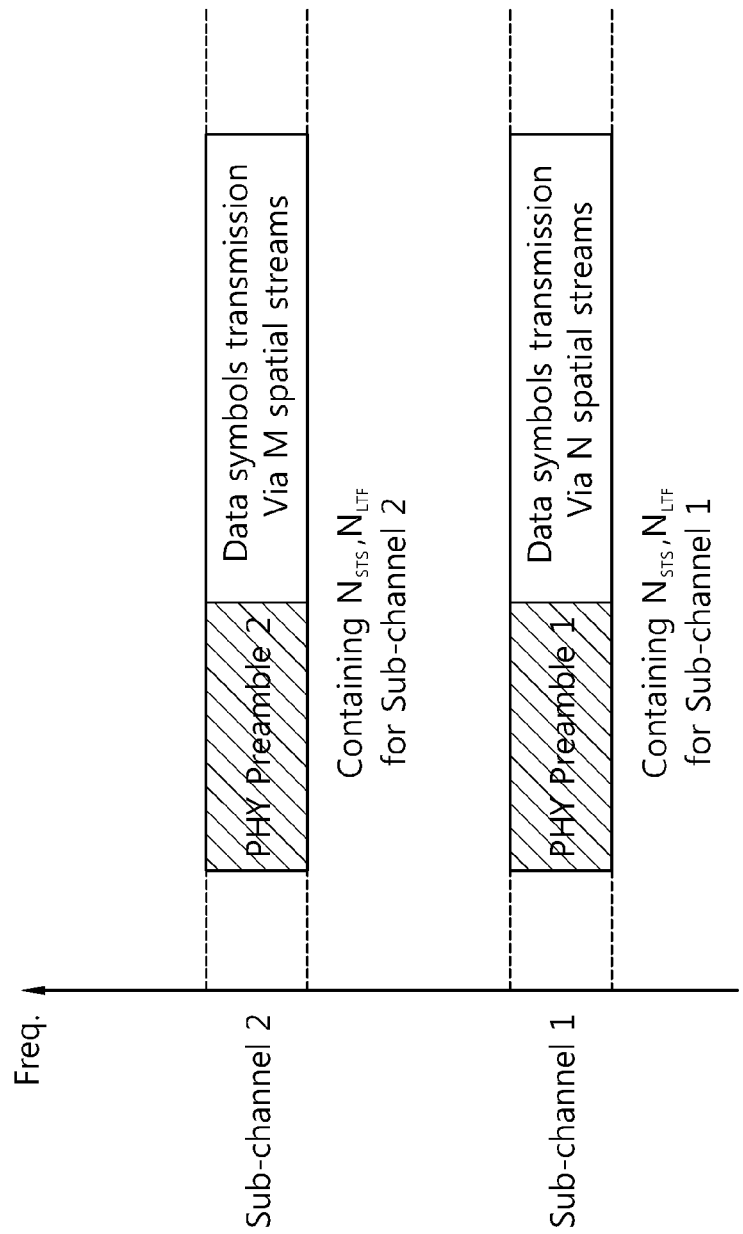
FIG. 3 is a simplified diagram illustrating a method of transmitting a data symbol according to an embodiment of the present invention.

FIG. 3 is a simplified diagram illustrating a method of transmitting a data symbol according to an embodiment of the present invention.

In accordance with an embodiment of the present invention, when data is transmitted using a plurality of spatial streams, the plurality of spatial streams are transmitted over a multi-channel. Here, the number of spatial streams transmitted over a first sub-channel and the number of spatial streams transmitted over a second sub-channel may be separately set. Furthermore, different MCS values for the first sub-channel and the second sub-channel may be set.

In accordance with an embodiment of the present invention, when data is transmitted, PHY preamble parts may be separately transmitted over a first sub-channel and a second sub-channel. That is, a first PHY preamble may be transmitted over the first sub-channel, and a second PHY preamble may be transmitted over the second sub-channel. Each of the first PHY preamble and the second PHY preamble may include an MRQ (MCS feedback Request) message. A reception STA may receive the MRS message through each sub-channel and send an MFB (MCS Feedback) message in response thereto. That is, a link adaptation procedure may be performed by the sub-channel. An MCS value for each sub-channel may be determined by the sub-channel through the link adaptation procedure, and the MCS value may be incorporated when data is subsequently transmitted. The index of the MCS value determined by the sub-channel may be included in the VHT-SIG A field or the VHT-SIG B field of each PHY preamble transmitted over each sub-channel and then transmitted.

In accordance with an embodiment of the present invention, when the number of spatial streams is determined by the sub-channel, different spatial streams may be transmitted by the sub-channels. For example, two spatial streams may be transmitted over a first sub-channel, and four spatial streams may be transmitted over a second sub-channel. If the number of spatial streams transmitted over the first sub-channel differs from the number of spatial streams transmitted over the second sub-channel as described above, a problem may occur in the beamforming transmission of a data part. The data part may be composed of one or more OFDM (orthogonal frequency division multiplexing) symbols.

If a different number of spatial streams are transmitted by the sub-channel, the number of training sequences (for example, VHT-LTFs) for channel estimation is different. Consequently, there is a problem in that the length of the PHY preamble is varied. If the length of the PHY preamble is varied, there is a problem in that beam-forming may not be applied to a data symbol. A VHT-LTF is described hereinafter as an example of a training sequence transmitted for channel estimation, but the term 'VHT-LTF' is illustrative and may be called various names, such as a training signal or a reference signal.

In the above example, two spatial streams are transmitted over the first sub-channel, and four spatial streams are transmitted over the second sub-channel. In this case, however, two VHT-LTFs are transmitted over a first PHY preamble transmitted over the first sub-channel, and four VHT-LTFs are transmitted over a second PHY preamble transmitted over the second sub-channel. If a data symbol is transmitted after a training sequence, the data symbol is first transmitted over the first sub-channel. Consequently, the data symbol is transmitted over the first sub-channel, and the second PHY preamble is still transmitted over the second sub-channel. If the training sequence included in the PHY preamble is not subjected to beam-forming, beam-forming is not also applied to the data symbol transmitted over the first sub-channel.

In accordance with an embodiment of the present invention, if a different number of training sequences must be transmitted over each of non-contiguous sub-channels as described above, the PHY preamble transmitted over each sub-channel has the same length. To this end, the same number of training sequences is transmitted over each of the non-contiguous channels. That is, in the above example, four training sequences (that is, four VHT-LTFs) are transmitted over each of the first PHY preamble and the second PHY preamble so that the first PHY preamble and the second PHY preamble have the same length. In this case, two of the four VHT-LTFs transmitted over the first PHY preamble are transmitted in order to conform to the length of the second PHY preamble and must be distinguished from two VHT-LTFs transmitted for channel estimation for two spatial streams transmitted over the first sub-channel. It is hereinafter assumed that a training sequence transmitted for the channel estimation of a spatial stream actually transmitted through what sub-channel is called an effective LTF and a training sequence transmitted in order to conform to the length of a PHY preamble transmitted over each sub-channel is an inoperative LTF. In the above example, it may be said that two of the four VHT-LTFs of the first PHY preamble correspond to effective LTFs and the remaining two VHT-LTFs thereof correspond to inoperative LTFs. On the other hand, it may be said that the four VHT-LTFs of the second PHY preamble correspond to effective LTFs.

A method of generating the sequence of an inoperative LTF is not specially limited. The sequence of an inoperative LTF may be generated using a sequence used to generate an effective LTF or an effective LTF may be duplicated and transmitted. Alternatively, a specific sequence used to generate an inoperative LTF may be set and used.

When a plurality of training signals is transmitted over a specific sub-channel, a reception STA must be able to determine that what training signal corresponds to an effective LTF. In the above example, when the four VHT-LTFs are transmitted over the first sub-channel, the reception STA must be able to determine that the former two VHT-LTFs are effective LTFs and the latter two VHT-LTFs are inoperative LTFs. To this end, in accordance with an embodiment of the present invention, a PHY preamble transmitted over each sub-channel may include information about the number of training sequences and the number of spatial streams. The number of training sequences refers to the total number of VHT-LTFs transmitted over a relevant sub-channel, and the number of spatial streams refers to the number of spatial streams transmitted over a relevant sub-channel. The reception STA can distinguish the number of effective LTFs from the number of inoperative LTFs based on the number of spatial streams.

In the above example, each of the first PHY preamble transmitted over the first sub-channel and the second PHY preamble transmitted over the second sub-channel may include the following field information.

The first PHY preamble for the first sub-channel
Number of Training Sequences: 4
Number of Spatial Streams: 2
The second PHY preamble for the second sub-channel
Number of Training Sequences: 4
Number of Spatial Streams: 4

The length of the PHY preamble transmitted over each sub-channel is the same through two fields, but spatial streams transmitted over each sub-channel may have a different number.

A reception STA can know the total number of training sequences transmitted over the PHY preamble based on the field 'Number of Training Sequence' and also know the number of spatial streams that must be received based on the field 'Number of Spatial Streams'.

In accordance with another embodiment of the present invention, only information indicating the field 'Number of Spatial Stream' may be included in the PHY preamble and transmitted. In the above example, only the following field information is included in the PHY preamble.

The first PHY preamble for the first sub-channel
Number of Spatial Streams: 2
The second PHY preamble for the second sub-channel
Number of Spatial Streams: 4

In this case, since information about the total length of the training sequences (or the total number of VHT-LTFs) transmitted over a sub-channel is not incorporated into the field 'Number of Spatial Streams', a reception terminal is unable to know the total length of the training sequences. In accordance with an embodiment of the present invention, a certain number (K) of VHT-LTFs may be always transmitted without transmitting the information about the total number of VHT-LTFs transmitted over each sub-channel.

Here, K may be the number of VHT-LTFs corresponding to a maximum value of the number of spatial streams that may be transmitted over the sub-channel. If a maximum of four spatial streams can be transmitted over each of a first sub-channel and a second sub-channel, a transmission STA may always send four VHT-LTFs over each sub-channel and omit information about the total number of VHT-LTFs transmitted over each sub-channel in the PHY preamble.

Table 2 is an example of a PHY preamble, including the number of training sequences $N_{LTF}$ and the number of spatial stream $N_{STS}$ according to an embodiment of the present invention. More particularly, in this example, the number of training sequences $N_{LTF}$ and the number of spatial stream $N_{STS}$ are included in the VHT-SIG A field of the PHY preamble.

and/or data processors. The memory 520 may include Read-Only Memory (ROM), Random Access Memory (RAM), flash memory, a memory card, a storage medium and/or other storage devices. When the embodiments are implemented in software, the above schemes can be implemented using a module (or process or function) that performs the above-described functions. The module may be stored in the memory 520 and executed by the processor 510. The memory 520 may be external or internal to the processor 510 and may be connected to the processor 510 using various well-known means.

While the invention has been described in connection with what is presently considered to be practical exemplary

TABLE 2

| VHT-SIG-A | MU-Bit Allocation | SU-Bit Allocation | Explanatory Note |
|---|---|---|---|
| Coding Bit | 1-2 (TBD) | 1-2 (TBD) | 1 bit to indicate LDPC vs. BCC |
| STBC | 1 | 1 | 1 bit to indicate Alamouti |
| MCS | 0 | 4 | Equal modulation only<br>MCS for MU in VHT-SIG-B |
| Group ID | 6 | 6 | Used to identifying users |
| $N_{LTF}$ | 3<br>(the number of LTFs) | 3<br>(the number of LTFs) | $N_{LTF}$ bits used to indicate the number of total traning sequences |
| $N_{STS}$ | 12<br>(3 bits/user with maximum 4 users) | 12<br>First 3 bits convey stream allocation<br>Remaining 9 bits may be reserved | $N_{STS}$ bits used to indicate spatial streams per user |
| Short GI | 2 | 2 | 1 bit to indicate L/S Guard Interval(GI)<br>1 bit for short GI packet length ambiguity mitigation |
| BW | 2-3 | 2-3 | Allows 20, 40, 80, 80 + 80, 160 MHz modes. Other Modes TBD |
| CRC | 8 | 8 | |
| Tail | 6 | 6 | |
| Reserved bits | 5-7 | 5-7 | |

In Table 2, fields other than the fields $N_{LTF}$ and $N_{STS}$ included in the VI-IT-SIG A field may be deleted if needed or may be replaced with fields indicating other pieces of information.

Figure 4:
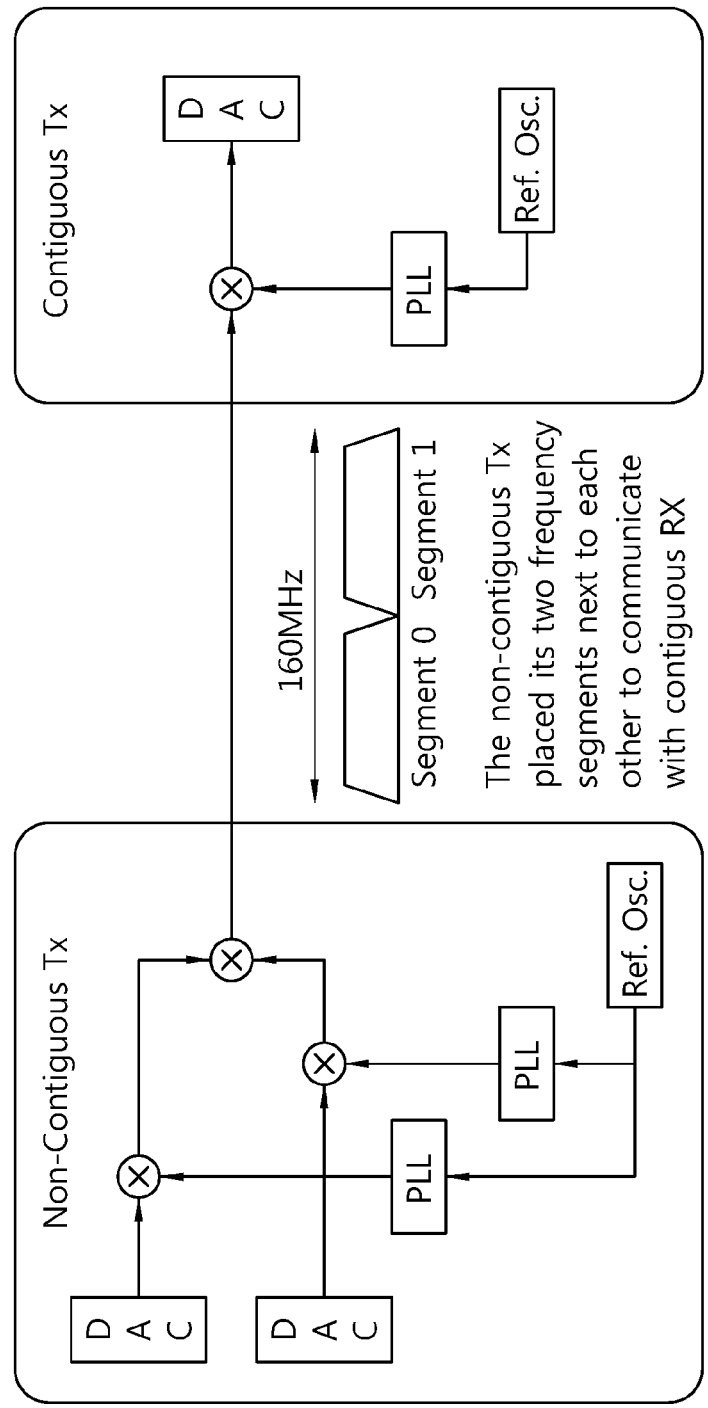
FIG. 4 shows an example of a multi-channel transmission block diagram.

FIG. 4 shows an example of a multi-channel transmission block diagram.

A first PHY preamble and a second PHY preamble are transmitted over the first sub-channel and the second sub-channel of non-contiguous frequency bands.

Figure 5:
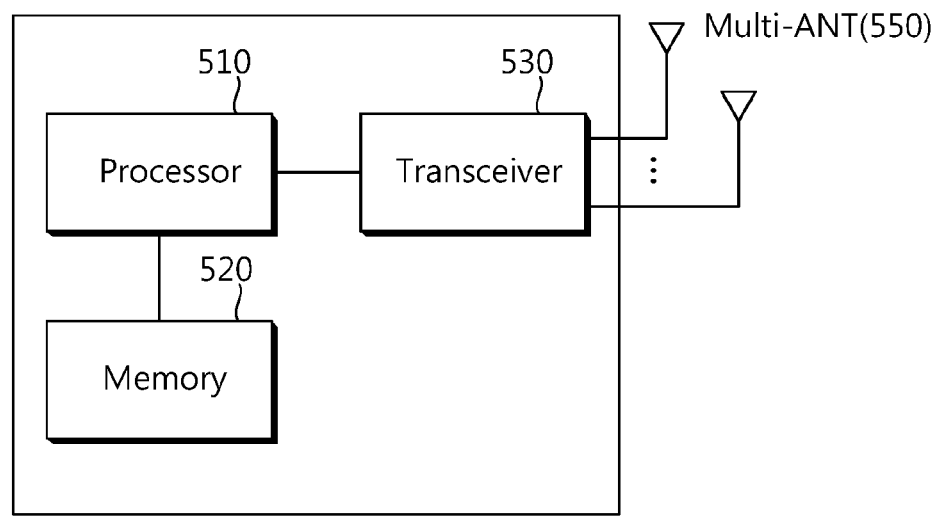
FIG. 5 is a block diagram showing a wireless apparatus in which an embodiment of the present invention is implemented.

FIG. 5 is a block diagram showing a wireless apparatus in which an embodiment of the present invention is implemented. The wireless apparatus 500 may be an AP STA or a non-AP STA.

The wireless apparatus 500 includes a processor 510, memory 520, a transceiver 530, and a multi-antenna 550. The transceiver 530 is configured to send or receive management frames and data packets according to the present invention. The processor 510 is functionally coupled to the transceiver 530 and configured to generate control information and to send the control information through the multi-antenna 550. Here, the control information may be a PHY preamble in the above embodiments. Furthermore, the processor 510 may send data symbols using a multi-channel obtained by aggregating a plurality of sub-channels and, at the same time, differently set an MCS value or the number of spatial streams or both by the sub-channel. The PHY layer and the MAC layer of the IEEE 802.11 standard may be implemented in the processor 510 and the transceiver 530. The processor 510 or the transceiver 530 or both may include Application-Specific Integrated Circuits (ASICs), other chipsets, logic circuits, embodiments, it is to be understood that the invention is not limited to the disclosed embodiments, but, on the contrary, is intended to cover various modifications and equivalent arrangements included within the spirit and scope of the appended claims.

The invention claimed is:

1. A method of transmitting control information in a wireless local area network (WLAN) system, the method comprising:

transmitting, by a transmitting station, a first physical (PHY) preamble over a first sub-channel to a first receiving station;

transmitting, by the transmitting station, a second PHY preamble over a second sub-channel to a second receiving station; and transmitting, by the transmitting station, data symbols using N spatial streams transmitted over the first sub-channel to the first receiving station and M spatial streams transmitted over the second sub-channel to the second receiving station on an overlapped time resource, wherein the first PHY preamble comprises control information necessary to demodulate and decode the data symbols transmitted over the N spatial streams, wherein the second PHY preamble comprises control information necessary to demodulate and decode the data symbols transmitted over the M spatial streams, wherein the first PHY preamble comprises information on a number of spatial streams among the N spatial streams for the first receiving station transmitted over the first sub-channel, wherein the second PHY preamble comprises information on a number of spatial streams among the M spatial streams for the second receiving station transmitted over the second sub-channel, wherein the first PHY preamble and the second PHY preamble are simultaneously transmitted, wherein the first PHY preamble and the second PHY preamble have an identical number of training sequences, and wherein the N and the M are natural numbers.

2. The method of claim 1, wherein the first sub-channel and the second sub-channel are non-contiguous frequency bands.

3. The method of claim 2, wherein the first sub-channel and the second sub-channel have an identical bandwidth.

4. The method of claim 2, wherein:

the first PHY preamble further comprises information about the number of training sequences transmitted over the first sub-channel, and the second PHY preamble further comprises information about the number of training sequences transmitted over the second sub-channel.

5. The method of claim 4, wherein:

each of the first PHY preamble and the second PHY preamble comprises four training sequences, the first PHY preamble comprises information about the number of spatial streams transmitted over the first sub-channel, and the second PHY preamble comprises information about the number of spatial streams transmitted over the second sub-channel.

6. The method of claim 1, wherein a first modulation and coding scheme (MCS) value, applied to an orthogonal frequency division multiplexing (OFDM) symbol of data transmitted over the first sub-channel and a second MCS applied to an OFDM symbol of data transmitted over the second sub-channel are differently set.

7. The method of claim 6, wherein:

the first PHY preamble comprises an index indicating the first MCS, and the second PHY preamble comprises an index indicating the second MCS.

8. The method of claim 6, wherein:

the first PHY preamble comprises an MCS feedback request message, requesting a reception STA which receives at least one spatial stream transmitted over the first sub-channel to send an adequate candidate MCS index in order to update the first MCS, and the second PHY preamble comprises an MCS feedback request message, requesting a reception STA which receives at least one spatial stream transmitted over the second sub-channel to send an adequate candidate MCS in order to update the second MCS.

9. A wireless apparatus operating in a wireless local area network (WLAN) system using a multi-channel obtained by aggregating a first sub-channel and a second sub-channel, the wireless apparatus comprising:

a processor; and a memory coupled to the processor, wherein the memory comprises instructions which, when executed by the processor, cause the processor to:

send a first physical (PHY) preamble over the first sub-channel to a first receiving station;

send a second PHY preamble over the second sub-channel to a second receiving station; and send data packets using N spatial streams transmitted over the first sub-channel to the first receiving station and M spatial streams transmitted over the second sub-channel to the second receiving station on an overlapped time resource, wherein the first PHY preamble comprises control information necessary to demodulate and decode the data symbols transmitted over the N spatial streams, wherein the second PHY preamble comprises control information necessary to demodulate and decode the data symbols transmitted over the M spatial streams, wherein the first PHY preamble comprises information on a number of spatial streams among the N spatial streams for the first receiving station transmitted over the first sub-channel, wherein the second PHY preamble comprises information on a number of spatial streams among the M spatial streams for the second receiving station transmitted over the second sub-channel, wherein the first PHY preamble and the second PHY preamble are transmitted on an overlapped time resource, wherein the first PHY preamble and the second PHY preamble have an identical number of training sequences, and wherein the N and the M are natural numbers.

* * * * *